(12) United States Patent
Knepple et al.

(10) Patent No.: US 8,168,345 B2
(45) Date of Patent: May 1, 2012

(54) DEVICE AND METHOD FOR OPERATION OF A FUEL CELL

(75) Inventors: Ronny Knepple, Uberlingen (DE); Dieter Blumenstein, Uhldingen-Muhlhofen (DE); Bernd Speth, Uberlingen (DE)

(73) Assignee: Diehl Aerospace GmbH, Uberlingen (DE)

( * ) Notice: Subject to any disclaimer, the term of this patent is extended or adjusted under 35 U.S.C. 154(b) by 486 days.

(21) Appl. No.: 12/420,124

(22) Filed: Apr. 8, 2009

(65) Prior Publication Data

US 2009/0258258 A1 Oct. 15, 2009

(30) Foreign Application Priority Data

Apr. 15, 2008 (DE) .................. 10 2008 018 780

(51) Int. Cl.
*H01M 8/04* (2006.01)
(52) U.S. Cl. ...................................... 429/446
(58) Field of Classification Search ............ 429/446, 429/513
See application file for complete search history.

(56) References Cited

U.S. PATENT DOCUMENTS

| | | | |
|---|---|---|---|
| 6,913,676 B2 * | 7/2005 | Nau et al. ............... | 204/279 |
| 7,875,396 B2 * | 1/2011 | Zhang et al. ............ | 429/413 |
| 2003/0124404 A1 | 7/2003 | Nau et al. | |
| 2004/0072040 A1 | 4/2004 | Duffy et al. | |
| 2005/0282057 A1 | 12/2005 | Brenner et al. | |
| 2008/0001313 A1 * | 1/2008 | Zhang et al. ............ | 261/100 |
| 2011/0039167 A1 * | 2/2011 | Zhang et al. ............ | 429/413 |

FOREIGN PATENT DOCUMENTS

| | | |
|---|---|---|
| DE | 100 02 003 A1 | 8/2001 |
| DE | 10 2004 029 840 A1 | 12/2005 |
| DE | 10 2007 029 596 A1 | 1/2008 |
| JP | 57-23475 | 2/1982 |
| JP | 60-208060 | 10/1985 |
| JP | 60-212967 | 10/1985 |
| JP | 06-36785 | 2/1994 |
| JP | 2004-134161 | 4/2004 |

* cited by examiner

*Primary Examiner* — Javaid Nasri
(74) *Attorney, Agent, or Firm* — Scully, Scott, Murphy & Presser, P.C.

(57) ABSTRACT

A pressure equalizing system (16) having two variable volume elements which interact with one another via a separating medium which can be deformed or can be moved as a function of the pressure difference, with a constant total volume, is positioned upstream of a fuel cell (11) in order to feed the fuel cell (11) with its raw-material gases (H, O). A pressure equalizing container (19) can be provided for this purpose, which is subdivided into two chambers (17H, 17O) by a separating wall (18) which can be deformed or can be moved as a function of the pressure difference; alternatively, two chambers (17H, 17O) are connected to one another by an equalizing channel (21) with a solid or liquid separating medium which can be moved therein as a function of the pressure difference. If the raw-material gas pressures are different, the separating medium is moved towards the chamber (17) with the lower gas pressure until a pressure equilibrium is achieved as a consequence of the corresponding change in the volume elements on both sides of the separating medium. In the fuel cell (11) which is fed from the chambers (17), its membrane (12), which is susceptible to fracture, therefore no longer has a destruction-critical dynamic pressure difference applied to it, without having to take control measures for this purpose in feed fittings for the raw-material gases.

15 Claims, 2 Drawing Sheets

DEVICE AND METHOD FOR OPERATION OF A FUEL CELL

BACKGROUND OF THE INVENTION

1. Field of the Invention

The invention relates to a device and a method for the operation of a fuel cell with raw-material gases being fed to it on both sides of an electrolytic membrane thereof.

2. Discussion of the Prior Art

By way of example, DE 10 2007 029 596 A1 describes that an electrolyte membrane, which is permeable for protons but is not permeable for electrons, keeps the two raw-material gases, which are fed in continuously, specifically the fuel supplied on the anode side (for example hydrogen) and the oxidant supplied on the cathode side (for example the oxygen contained in the surrounding area) separate from one another in a fuel cell. In particular, the membrane may be in the form of a thin polymer film (in a fuel cell of the PEM type) or in the form of a brittle oxide ceramic (in a fuel cell of the SOFC type).

The invention is based on the discovery that a very thin membrane such as this is highly susceptible to a fracture as a result of steady-state, and to an even greater extent, dynamic pressure differences on both sides of the membrane in the cell. Pressure regulation, which reacts sufficiently quickly and nevertheless without overshooting, of one of the two raw-material gases as a function of the instantaneous feed pressure of the other raw-material gas is, however, highly complex; in particular, neither the outlet valve of a gas cylinder or a fuel reservoir of this type nor the compressor for the air supply can in practice be adjusted sufficiently quickly, continuously and accurately for defined pressure changes. It is particularly critical that, depending on the instantaneous supply and operating circumstances, for example in the event of load changes, the pressure gradient across the membrane may be reversed briefly and at short notice. Synchronous pressure profiles must be maintained not only during the operation of the cell but also when it is being started up at the start of operation and shut down at the end of operation, in order to avoid loads on one side of the membrane, and this is additionally problematic from the operational point of view and can be coped with only to a restricted extent even with a high degree of active control complexity. Any control matching between the two gas pressures which interact with one another is, on the other hand, completely impossible from the installation point of view in the fuel cell itself.

The invention is therefore based on the technical problem of operating a fuel cell more conservatively without any particularly complex additional installation complexity.

SUMMARY OF THE INVENTION

According to the invention, this object is achieved by the major features stated in the main claims. According to these features, the two raw-material gases are passed through a pressure equalizing system, with two areas whose volumes interact with one another as a function of the pressure difference, before they are fed into the fuel cell. These areas may be the two volume elements of the chambers, which are variable in opposite senses, of an equalizing container which is divided by a gas-tight separating wall; alternatively, the two chambers are connected to one another by an equalizing channel in which a gas-resistant piston is moved as a function of the pressure difference. A piston such as this is moved in a particularly pressure-sensitive manner and without leakage when it is in the form of an ionic liquid, specifically a liquid containing gas-resistant salts, which is preferably located in a self-sealing form in a submerged siphon or U-shaped siphon with a pressure equilibrium, with this siphon being integrated in the course of the equalizing channel.

In any case, with a constant total volume, the volume elements which are filled with the raw-material gases are variable in the sense that an increase in one of the two volume elements as a function of the gas pressure leads to an equal decrease in the other volume element until there is a pressure equilibrium between the two volume elements. In consequence, the raw-material gas flows from the two steady-state volume elements always act with virtually the same pressure on both sides of the cell membrane; this now reliably suppresses the mechanical danger to the membrane resulting from any pressure differences across the membrane.

If the solution according to the invention is implemented with an equalizing container which is subdivided into the two chambers with mutually dependent volumes, this is preferably like a boiler with a separating wall which is gas-tight and pressure-resistant but can be moved as a function of the pressure, in particular which can be positioned centrally and otherwise can be deformed as a function of the pressure difference, between the chambers. The volume elements which result in the container on the basis of the instantaneous position of the separating wall and make up the constant total volume or container volume are adjacent to one another on both sides of the separating wall. The separating wall is expediently a structure which can physically be fixed in the equalizing container, extends to a greater or lesser extent into the adjacent volume element depending on the excess pressure in one volume element and reduces that volume element in a corresponding manner in consequence, until a pressure equilibrium has been created between the two volume elements as a result of the pressure reduction resulting from the increase in the first-mentioned volume element and thus the pressure increase at the same time as a result of the reduction in the second-mentioned volume element.

This applies in a corresponding manner to the volume change in the two parts of an equalizing channel which connects two chambers to one another and in which a gas-resistant separating medium is moved as a function of the pressure.

The raw-material gases which are supplied to the fuel cell from the steady-state volume elements originate directly from supply chambers which are at least approximately at the same pressure as one another, specifically from the pressure-matched volume elements of the equalizing container or the equalizing channel.

It is now therefore also superfluous to use an intrinsically conventional initial pressure vessel for the compressor for the oxidant. Its function can also be carried out by the corresponding volume element, such that the resultant additional requirement for installation space for the equalizing container with the two chambers, or for the two chambers with their equalizing channel, is small.

A beaded metal membrane, for example of the type that is used for aneroid manometers, can be used as a separating wall which extends with a reversible shape change into in each case one of the two volume elements. When a plastic film is used for the separating wall, this need not be elastomeric; it is sufficient for it to be flexible (and, of course, impermeable for the raw-material gases on both sides of it). Since it need not be taut, it just carries out a bulging deformation as a result of the instantaneous overpressure on one of its sides, in order to reduce the volume on the adjacent side. In order to avoid local overloading when stress peaks occur suddenly, this variable-shape separating wall advantageously has an approximately circular edge; alternatively, it is in any case mounted in a round opening in a mounting wall which then itself rests in a gas-tight manner against the internal periphery of the equalizing container. For maximum dynamic response, the separating wall should have low mass and should be easily movable; elastic characteristics (restriction for dynamic response) should advantageously come into effect only at the maximum deflection of the separating wall, in order to protect it.

When the pressure change between the two raw-material gases is perceptibly different, it may be expedient not to arrange the movable separating wall centrally between volume elements of equal size in the equalizing container but to install it eccentrically in the steady state in order to take account of any different amount of space required by the raw-material gases without the separating wall bulging out on one side, that is to say continuously directed only towards one side.

For simple matching to fuel cells with different raw-material requirements, it is also possible to provide for a mounting wall, which is interrupted by the installation opening for the deformable separating wall, to be mounted in a gas-tight manner, such that it can be moved laterally in the equalizing container, in order to match the respective volume elements to a different gas requirement.

When designing and fitting the equalizing container, care must be taken to ensure that, when the separating wall has been deformed to the maximum extent, the inlet and outlet of the raw-material gases are also not impeded, in order to prevent this from causing any new preference differences.

Measures such as sensor fitting for example with optical position detection of the separating wall are expediently taken in order, for example, to close a throttle valve in the supply line of the raw-material gas which is supplied at the higher pressure, partially or temporarily completely, when the separating wall approaches its maximum deformation, or even before then.

BRIEF DESCRIPTION OF THE DRAWINGS

Additional developments and modifications of the solution according to the invention will become evident from the further claims and, with regard to their advantages as well, from the following description of preferred implementation examples, which are abstracted in the drawing to what is functionally essential and are sketched reduced in size and not to scale, for application to a fuel cell, free of any pressure gradient according to the invention, of the raw-material gases which are supplied to it, according to the invention, via a two-chamber equalizing system. In the drawing:

DETAILED DESCRIPTION OF THE INVENTION

Figure 1:
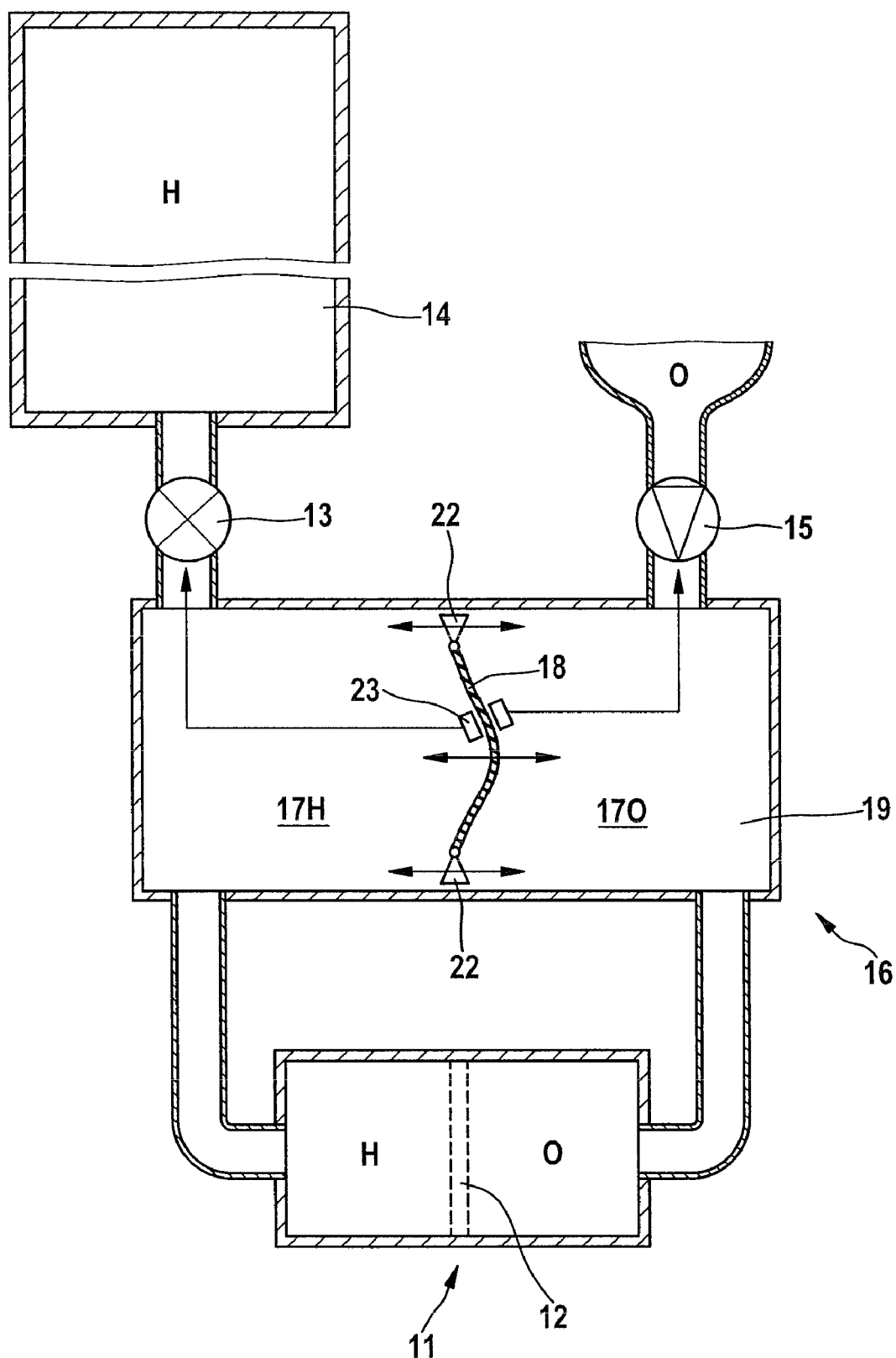
FIG. 1 shows an equalizing container, which is subdivided by a variable separating wall into two chambers, whose volume is dependent on the pressure difference, for the two raw-material gases, upstream of the fuel cell.

A fuel cell 11 is split in two by an electrolytic membrane 12. By way of example, on one side of the membrane 12, specifically the anode side, the cell 11 is fed with hydrogen H as fuel via a pressure-reducing valve 13 from a generator or from a reservoir 14 such as a compressed-gas cylinder and, opposite this, that is to say on the cathode side, the cell is fed for example with oxygen O as the oxidant (from a reservoir or) from the surrounding air, which is supplied by means of a compressor 15.

Figure 2:
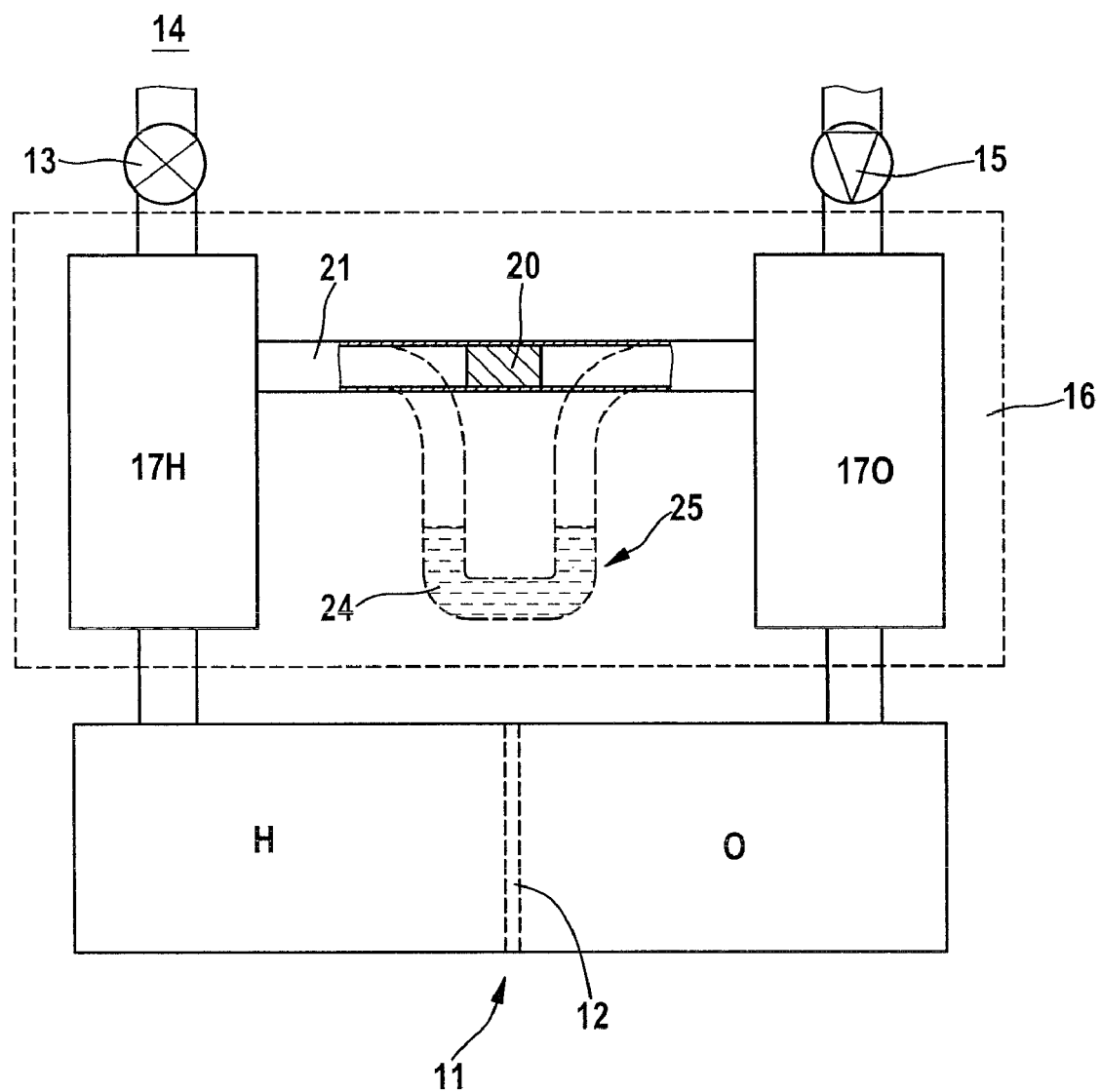
FIG. 2 shows, instead of this, an equalizing system with a solid or liquid piston, which can be moved in an equalizing channel between two raw-material gas chambers as a function of the pressure difference, for feeding the fuel cell.

This raw-material gas feed is now, however, according to the invention no longer provided directly to the fuel cell 11 but via a pressure equalizing system 16, which is connected directly upstream of it, with two pressure equalizing chambers 17H, 17O which, in the case of FIG. 1, are separated from one another in a gas-tight manner by a separating wall 18, which can be deformed by pressure, as a function of the pressure difference, in a similar manner to a membrane, in a pressure-difference equalizing container 19 and, in the case of FIG. 2, are separated from one another in a gas-tight manner by a piston 20 in a pressure-difference equalizing channel 21.

Means such as movable holders 22, which are sketched in a simplified symbolic form in FIG. 1, for the separating wall 18 in the equalizing container 19 can be taken into account by different steady-state volume elements when the pressure change of one of the raw-material gases H or O to be passed through is considerably greater than that of the other O or H, respectively, for operation of the fuel cell 11.

FIG. 1 also symbolically takes account of any sensors 23 fitted to the movable separating wall 18, for example with strain gauges, which could advantageously be implemented, for example, by means of optical position detection. When sensing a particularly major, in particular a maximum permissible, pressure imbalance, this makes it possible to act on the raw-material gas supplies in order, in the example shown in the drawing, to restrict the hydrogen supply and/or to increase the air supply, which corresponds to active pressure equalizing control, in order in particular to also suppress steady-state pressure differences. For example, let us assume that the gas pressure of the air with the oxidant O in the fuel cell 11 while starting up the compressor 15 at the beginning of operation is lower than that of the fuel H emitted via the valve 13 from a pressure container or similar reservoir 14; this would load one side of the membrane 12 in the cell 11, therefore resulting in a risk of destruction. However, this is now reliably suppressed according to the invention in that both raw-material gases H and O are fed into the fuel cell 11 via the same pressure equalizing system 16 and thus virtually without any pressure difference between them.

This is because, in the case of FIG. 1, the initially even higher pressure in the chamber 17H displaces the separating wall 18 of the equalizing container 19 with at least a part of its surface into the adjacent chamber 17O, with a decrease in pressure, as a result of the enlargement of one volume element in the equalizing container 19, as a result of which displacement its volume element is reduced to the same extent, and the gas pressure therein is correspondingly raised. Equal gas pressures are therefore now created virtually without any delay on both sides of the separating wall 18 for the feeding of the raw-material gases H, O into the fuel cell 11, with this feed now taking place from the equalizing container 19. The membrane 12, which is susceptible to fracturing, in the fuel cell 11 now in any case therefore no longer has the destruction-critical pressure difference applied to it.

In the case of the example of the pressure equalizing system 16 shown in FIG. 2, the two variable volume elements with a constant total volume are located in the equalizing channel 21 which connects the two raw-material gas chambers 17H, 17O to one another, specifically on both sides of the piston 20 which is moved therein as a function of the pressure difference to create a pressure equilibrium. In the interests of good gas sealing despite little friction and a correspondingly good dynamic reaction to pressure changes, a solid piston 20 is preferably not used but (according to the alternative indicated by dashed lines in FIG. 2) a liquid piston 24 which is designed to be gas-resistant and locally fills the cross section of the equalizing channel 21. For self-sealing closure of the equalizing channel 21, the liquid piston 24 is preferably moved as a function of the pressure difference by means of a siphon 25 which is formed in the course of the equalizing channel 21, which siphon 25 may also be in the form of a submerged siphon or, as sketched, U-shaped as a communicating tube.

Thus, according to the invention, a pressure equalizing system 16 with variable volume elements of a constant sum or total volume is positioned upstream of a fuel cell 11 for feeding its raw-material gases H, O, which total volume has, as a separating medium, a deformable separating wall 18 between two mutually adjacent chambers 17H, 17O of an equalizing container 19 or a movable piston 20 in an equalizing channel 21 between two chambers 17H and 17O. If the raw-material gas pressures are different, the separating medium is moved towards the chamber 17 with the instantaneously lower gas pressure until a pressure equilibrium is created as a result of the different volume elements which are adjacent to one another on both sides of the separating medium. In the fuel cell 11 that is fed from the chambers 17, its membrane 12, which is sensitive to fracture, now in any case therefore no longer has the destruction-critical dynamic pressure difference between the raw-material gases H, O, which are supplied from the equalizing container 19, applied to it, without needing to take any active pressure control measures for this purpose on the inlet fittings for the raw-material gases H, O.

LIST OF REFERENCE SYMBOLS

H Hydrogen as fuel gas (in 11)
O Air oxygen as oxidant (in 11)
11 Fuel cell (with 12)
12 Membrane (in 11)
13 Valve (behind 14)
14 Reservoir (for H)
15 Compressor (for O)
16 Pressure equalizing system (with 19 or 21; before 11)
17 Pressure equalizing chambers 17H, 17O (in 19)
18 Separating wall (in 19 between 17H and 17O)
19 Pressure equalizing container (of 16 between 17H-17O)
20 Piston (in 21)
21 Pressure equalizing channel (of 16 between 17H-17O)
22 Movable holders (for 18 in 19)
23 Sensor fitting (for influencing of 18 to 13/15)
24 Liquid piston (for 25)
25 Siphon (in 21)

What is claimed is:

1. A device for operation of a fuel cell with raw-material gases, being fed to the fuel cell on both sides of an electrolytic membrane, the device comprising:
    a pressure equalizing system positioned upstream of the fuel cell, the pressure equalizing system comprising volume elements which depend on a pressure difference and have a constant total volume, to feed said raw-material gases on both sides of a separating medium which is movable as a function of the pressure difference;
    a pressure equalizing container divided by said separating medium into two chambers; and
    an equalizing channel connecting said two chambers to one another, said separating medium being movable in the equalizing channel.

2. The device according to claim 1, wherein said separating medium is in the form of a separating wall which is deformable by pressure or is movable by pressure, and said two chambers are bounded from one another and are adjacent to one another, for said two volume elements, respectively.

3. The device according to claim 2, wherein said deformable separating wall is arranged in a round opening formed in a mounting wall.

4. The device according to claim 2, wherein said separating wall in the equalizing container is arranged to be selectively eccentrically fixed or movable for steady-state presetting of different volume elements in the two chambers.

5. The device according to claim 1, wherein said separating medium is a piston.

6. The device according to claim 1 or 5, wherein the separating medium is in the form of an ionically gas-resistant liquid piston.

7. The device according to claim 6, wherein the liquid piston is held in a submerged siphon or U siphon which is formed in a path of the equalizing channel.

8. The device according to claim 1, wherein the separating medium is operatively connected to at least one sensor fitting for restriction of the supply of one of the two raw-material gases, which is at a higher pressure, into the pressure equalizing system, thereby suppressing any steady-state pressure differences.

9. The device according to claim 1, wherein the separating medium is operatively connected to at least one sensor fitting for increasing the supply of one of the two raw-material gases, which is at a lower pressure, into the pressure equalizing system, thereby suppressing any steady-state pressure differences.

10. A method for operation of a fuel cell, the method comprising:
    mutually equalizing the pressure in an upstream pressure equalizing system;
    moving a gas-resistant separating medium as a function of the pressure difference in a pressure equalizing channels between two chambers in the pressure equalizing system; and
    supplying the fuel cell with raw-material gases on both sides of an electrolytic membrane.

11. The method according to claim 10, further comprising:
    reducing or interrupting the supply of one of the raw-material gases which is supplied to the pressure equalizing system at a higher pressure upon detection of a maximum permissible pressure difference between the raw-material gases.

12. The method according to claim 10 or 11, wherein prior to the steps of mutually equalizing the pressure and supplying the fuel cell with raw-material gases, the raw-material gases are passed through, respectively, one of said two chambers which are bounded from one another in a pressure equalizing container by a separating wall which is deformable or movable as a function of a pressure difference.

13. The method according to claim 12, wherein said separating wall in the equalizing container is preset for steady-state volume elements which are not equal on the basis of a different demand for raw-material gases in the fuel cell.

14. The method according to claim 11, wherein an ionic liquid is displaced as the separating medium in a siphon.

15. The method according to claim 10, further comprising increasing the supply of one of the raw-material gases which is at a lower pressure.

* * * * *